United States Patent
Nakamura

(10) Patent No.: US 10,911,690 B2
(45) Date of Patent: Feb. 2, 2021

(54) IMAGE CAPTURING APPARATUS AND CONTROL METHOD THEREOF AND STORAGE MEDIUM

(71) Applicant: CANON KABUSHIKI KAISHA, Tokyo (JP)

(72) Inventor: Hinako Nakamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/539,140

(22) Filed: Aug. 13, 2019

(65) Prior Publication Data

US 2020/0077009 A1    Mar. 5, 2020

(30) Foreign Application Priority Data

Aug. 28, 2018  (JP) ................. 2018-159475

(51) Int. Cl.
*H04N 5/235* (2006.01)
*H04N 5/232* (2006.01)

(52) U.S. Cl.
CPC ......... *H04N 5/2353* (2013.01); *H04N 5/2357* (2013.01); *H04N 5/23232* (2013.01)

(58) Field of Classification Search
CPC . H04N 5/2353; H04N 5/23232; H04N 5/2357
See application file for complete search history.

(56) References Cited

U.S. PATENT DOCUMENTS

| 6,831,793 | B2 | 12/2004 | Nakamura |
| 8,890,975 | B2 | 11/2014 | Baba et al. |
| 9,756,258 | B2 * | 9/2017 | Ariga ............ G03B 7/093 |
| 9,794,493 | B2 * | 10/2017 | Ariga ............ G03B 7/093 |
| 2012/0002074 | A1 | 1/2012 | Baba et al. |
| 2015/0237247 | A1 | 8/2015 | Hara |

FOREIGN PATENT DOCUMENTS

| JP | 2011-160090 A | 8/2011 |
| JP | 2015-154413 A | 8/2015 |
| JP | 6070599 B2 | 2/2017 |

* cited by examiner

*Primary Examiner* — Twyler L Haskins
*Assistant Examiner* — Angel L Garces-Rivera
(74) *Attorney, Agent, or Firm* — Venable LLP

(57) ABSTRACT

An image capturing apparatus includes an imaging element which is capable of simultaneously performing exposures of different exposure times, a detection unit configured to detect flicker; and a control unit configured to control the imaging element such that, in a case where imaging is performed at a frame rate shorter than a period of the flicker, a first image is captured in a first region of the imaging element for a first exposure time which is an exposure time settable in one frame, and a second image is captured in a second region of the imaging element for a second exposure time which is a difference between a time of an integer multiple of the first exposure time and a time of the period of the flicker.

12 Claims, 5 Drawing Sheets

IMAGE CAPTURING APPARATUS AND CONTROL METHOD THEREOF AND STORAGE MEDIUM

BACKGROUND OF THE INVENTION

Field of the Invention

The present invention relates to a technique in an image capturing apparatus for reducing the influence of flicker appearing in an image.

Description of the Related Art

Electronic shutter schemes of CMOS sensors, which are imaging elements, include a global shutter scheme and a slit rolling shutter scheme. When imaging is performed by the schemes under a flicker light source, the former scheme generates images whose brightness changes for each imaging (referred to as surface flicker), and the latter scheme generates images whose brightness changes for each line (referred to as line flicker). In either case, an image with proper and stable brightness may not be obtained.

Techniques in which a difference from a proper exposure generated by a shutter scheme is corrected by image processing have been known. For example, Japanese Patent Laid-Open No. 2011-160090 discloses a technique for performing image processing using the inverse phase of the line flicker generated by a slit rolling shutter scheme as a correction coefficient.

In recent years, there have been CMOS sensors capable of performing a so-called multi-stream output in which images differing in frame rate and exposure are simultaneously output by separately changing read timings in line units (for each region) in a sensor. Japanese Patent No. 6070599 discloses a technique for creating an image having a large dynamic range by combining two images obtained by the above-mentioned multi-stream output.

Regarding the method for brightness correction of an image under a flicker light source, Japanese Patent Laid-Open No. 2011-160090 discloses that a reverse phase of a line flicker is calculated based on the integrated value of the line units of the image. Consequently, in the case where the flicker occurs only in a portion of the screen, this correction method excessively performs correction in the portion where no flicker has occurred although this correction method is effective in the case where the line flicker appears on the entire screen. In this case, unseen flicker may appear.

In addition, as a method for reducing the influence of flicker, a technique is known in which the accumulation time of the imaging element is set to a time of an integer multiple of the flicker period so as to reduce the exposure difference between images and within an image. This method, however, cannot be used when the time of one period of the flicker is longer than the time of one frame.

SUMMARY OF THE INVENTION

In view of the above-mentioned problems, the present invention provides an image capturing apparatus capable of reducing the influence of flicker appearing in an image captured under a flicker light source.

According to a first aspect of the present invention, there is provided an image capturing apparatus comprising: an imaging element in which a plurality of pixels are two-dimensionally arranged, the imaging element being capable of simultaneously performing exposures of different exposure times at pixels in different regions; at least one processor or circuit configured to function as the following units; a detection unit configured to detect flicker; and a control unit configured to control the imaging element such that, in a case where imaging is performed at a frame rate shorter than a period of the flicker detected by the detection unit, a first image is captured in a first region of the imaging element for a first exposure time, the first exposure time being an exposure time settable in one frame in the frame rate, and a second image is captured in a second region different from the first region of the imaging element for a second exposure time, the second exposure time being a difference between a time of an integer multiple of the first exposure time and a time of the period of the flicker.

According to a second aspect of the present invention, there is provided a method of controlling an image capturing apparatus comprising an imaging element in which a plurality of pixels are two-dimensionally arranged, the imaging element being capable of simultaneously performing exposures of different exposure times at pixels in different regions, the method comprising: detecting flicker; and controlling the imaging element such that, in a case where imaging is performed at a frame rate shorter than a period of the flicker detected by the detecting, a first image is captured in a first region of the imaging element for a first exposure time, the first exposure time being an exposure time settable in one frame in the frame rate, and a second image is captured in a second region different from the first region of the imaging element for a second exposure time, the second exposure time being a difference between a time of an integer multiple of the first exposure time and a time of the period of the flicker.

Further features of the present invention will become apparent from the following description of exemplary embodiments with reference to the attached drawings.

DESCRIPTION OF THE EMBODIMENTS

An embodiment of the present invention is described below with reference to the accompanying drawings.

Figure 1:
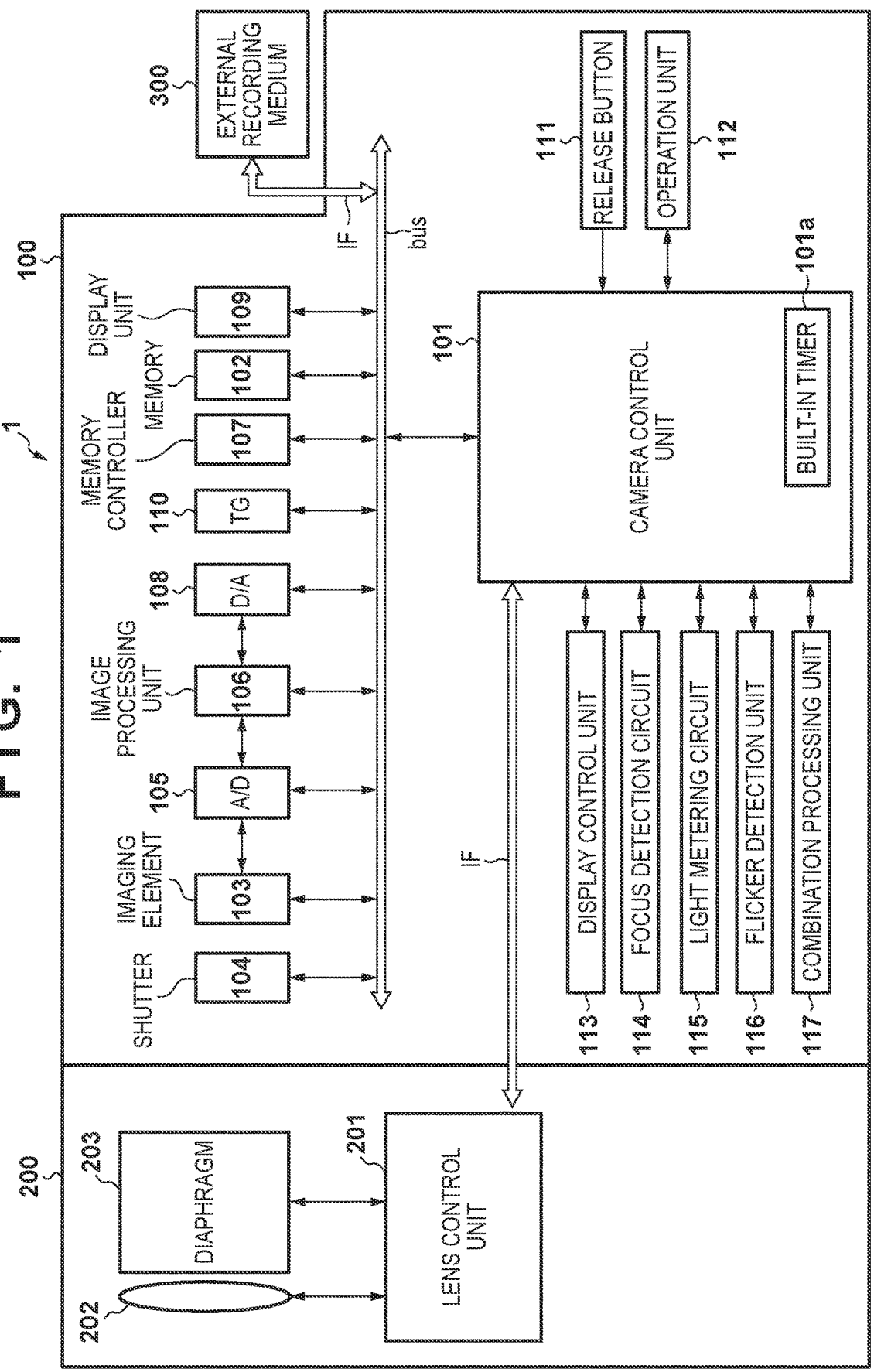
FIG. 1 is a block diagram illustrating a configuration of a digital camera, which is one embodiment of an image capturing apparatus of the present invention.

FIG. 1 is a block diagram illustrating a configuration of a digital camera (hereinafter simply referred to as a camera) 1, which is an embodiment of an image capturing apparatus of the present invention. Note that one or more functional blocks illustrated in FIG. 1 may be implemented by hardware such as an ASIC and a programmable logic array (PLA), or by software executed by a programmable processor such as a CPU or an MPU. A combination of software and hardware may be used for the implementation. Accordingly, in the following description, even when different functional blocks are described as operating subjects, the same hardware may be implemented as a subject.

In FIG. 1, the camera 1 includes a camera body 100 and a lens unit 200. The lens unit 200 is attachable to and detachable from the camera body 100. A configuration of the camera 1 in a state where the lens unit 200 is connected (attached) to the camera body 100 is described below with reference to FIG. 1. Note that the camera 1 may have a configuration in which the camera body 100 and the lens unit 200 are integrally provided.

In FIG. 1, a camera control unit 101 is a camera control means for comprehensively controlling the operation of the camera 1, and the camera control unit 101 includes therein a camera CPU as a microprocessor (computer) for the control. The camera control unit 101 includes therein a built-in timer 101a capable of measuring time. The built-in timer 101a is a so-called real time clock, and executes time measurement in each operation on the basis of the timer accuracy pre-saved in a memory 102 described below and information such as a time zone set at initial setting of the camera. Note that the camera control unit 101 executes various controls and processes described later on the basis of a computer control program stored in the memory 102 described below.

The memory 102 is a storage medium capable of storing data related to the operation of the camera 1 and various data obtained using the camera 1. The memory 102 of the present embodiment includes a ROM region as a non-volatile memory, and a RAM region as a volatile memory.

The lens control unit 201 is a lens control means for comprehensively controlling the operation of the lens unit 200, and the lens control unit 201 includes therein a lens CPU as a microprocessor (computer) for controlling the lens. With the lens unit 200 mounted to the camera body 100, the lens control unit 201 can mutually communicate with the camera body 100 side via an interface (IF) illustrated in FIG. 1. An imaging lens group 202 is a lens group including a plurality of lenses such as a shift lens, a zoom lens, and a focus lens, and is an optical member that guides a light flux corresponding to an optical image of a subject into an interior of the camera body 100. A diaphragm 203 is a light amount adjustment member for adjusting the light amount corresponding to the light flux entered through the imaging lens group 202.

The imaging element 103 is an imaging means adopting a solid-state imaging element of a charge accumulation type such as a charge coupled device (CCD) and a complementary metal oxide semiconductor (CMOS) sensor. The imaging element 103 performs photoelectric conversion on a subject image formed on an imaging surface of the imaging element 103, and outputs an analog image signal.

A shutter 104 is a shielding member capable of shielding light flux incident on the imaging element 103, and capable of transitioning between an open state for guiding the incident light flux to the imaging element 103 without shielding the incident light flux, and a shielding state for shielding the incident light.

An A/D conversion unit 105 is an A/D conversion means for converting, into a digital image data, an analog image signal output from the imaging element 103. An image processing unit 106 is an image processing means for performing, on the digital image data, a predetermined pixel interpolation process, a resizing process such as a reduction process, a color conversion process, an arithmetic process for the amount of data of pixels such as saturated pixels and blocked-up-shadow pixels, and the like.

A D/A converter 108 is a D/A conversion means for converting digital image data into analog image signals for display. The memory controller 107 is a recording control means for controlling input and output of image data to and from units such as the A/D converter 105, the image processing unit 106 and the D/A converter 108. While the camera 1 according to the present embodiment has a configuration in which the imaging element 103 is included as the imaging means, it is also possible to adopt a configuration in which the A/D converter 105, the image processing unit 106, the D/A converter 108, and the like are included as the imaging means, for example.

The display unit 109 is a display means composed of a thin-film-transistor liquid-crystal display (TFT-LCD) or the like, and is capable of displaying an analog image signal for display. Note that the display unit 109 is capable of performing a so-called live-viewing display (hereinafter referred to as LV display) for sequentially displaying image data obtained using the imaging element 103. Note that various information other than the obtained image data can be displayed on the display unit 109.

A timing generator (hereinafter referred to as TG) 110 is a timing generation means for outputting timing associated with each operation of the camera 1 to each unit of the camera 1. For example, the TG 110 is capable of generating timing associated with various operations such as a change of the charge accumulation and/or the frame rate in the imaging element 103, and a state change of the shutter 104.

A release button 111 is an imaging instruction means for instructing a start of an imaging setup operation and an imaging operation. In the camera 1 according to the present embodiment, when the user half-presses the release button 111 to bring the switch SW1 into ON state, the start of the imaging setup operation is instructed, and a focus control, a light metering operation, and the like described later are executed, for example. When the user completely presses the release button 111 to bring the switch SW2 into ON state, the start of the imaging operation is instructed, and a series of processes, from capturing a subject to completion of acquisition of a still image and a video image, is executed.

Figure 2:
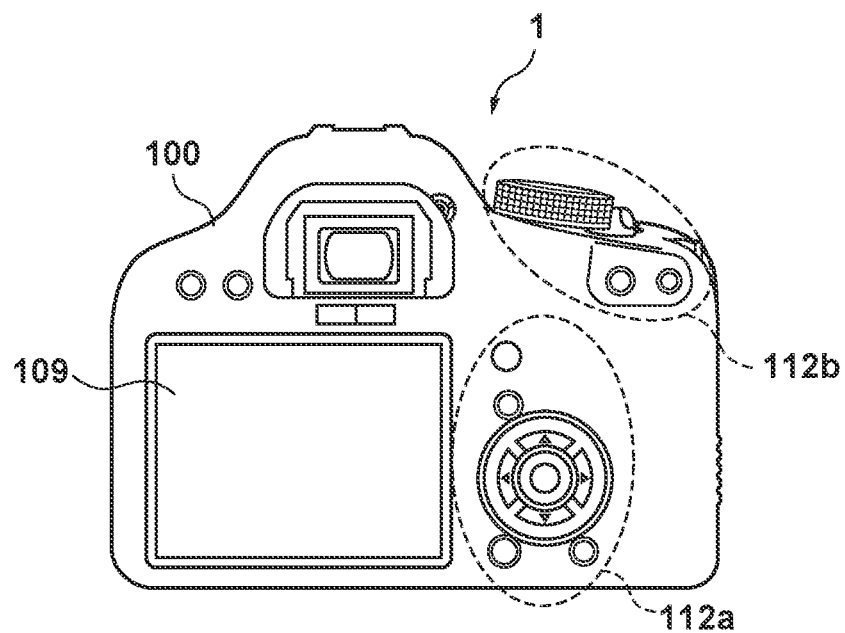
FIG. 2 is an external view of a digital camera according to one embodiment.

An operation unit 112 is an operation means for inputting various operation instructions corresponding to manual operations of the user into the camera control unit 101. FIG. 2 is an external view (rear view) of the camera 1 according to the present embodiment. The dashed line illustrated in FIG. 2 illustrates a first operation unit 112a and a second operation unit 112b included in the operation unit 112. The first operation unit 112a includes a direction instruction button for providing instructions of various operations related to image capturing, an LV button for providing instructions of execution and termination of an LV display in the display unit 109, and the like. The second operation unit 112b includes a power switch, a mode dial configured to set an image capturing mode, and the like. Note that a capacitive touch panel or the like may be adopted as the display unit 109 such that the display unit 109 functions as an operation means that allows for the above-mentioned operation inputs. A display control unit 113 is a display control means for controlling image display on the display unit 109. The display control unit 113 is capable of setting the selection of image data to be displayed on the display unit 109 in accordance with an instruction from the camera control unit 101, and on/off (display or non-display) of the display unit 109.

A focus detection circuit 114 is a focus detection means that includes a focus sensor (not illustrated) and detects a focus state of an optical image corresponding to a light flux entered from the lens unit 200 side. The focus detection circuit 114 is capable of calculating information on the distance from the camera 1 to a predetermined subject on the basis of a focus detection result. The detection result of the focus detection circuit 114 is used for controlling the lens position (focus control) of a focus lens (not illustrated) included in the lens unit 200. Note that the light flux entered through the imaging lens group 202 is guided to the imaging element 103 side and the focus sensor side by a mirror (not illustrated). The camera 1 according to the present embodiment is configured to use a phase difference detection scheme to perform the focus control on the basis of the output of the focus detection circuit 114 but may be configured to use a contrast detection scheme based on contrast information of image data. In addition, while the camera 1 according to the present embodiment includes a focus sensor separated from the imaging element 103, the camera 1 may be configured to execute focus detection on the basis of data output from pixels that are included in the imaging element 103 and are capable of performing focus detection without including a focus sensor.

A light metering circuit 115 is a light metering means that includes a light metering sensor (not illustrated) and calculates a light metering value corresponding to a light flux entered from the lens unit 200 side. A result of the light metering performed by the light metering circuit 115 is output to the camera control unit 101 and is used for exposure control. Note that the light metering circuit 115 may be configured to perform a light metering calculation on the basis of the output of the imaging element 103.

A flicker detection unit 116 compares a captured image accumulated in the imaging element 103 with images captured before and after that image to detect a period of flicker of illumination light in accordance with the regularity of light/dark. A combination processing unit 117 is an image processing unit configured to generate a combined image of a plurality of images.

The external recording medium 300 is a recording medium such as a memory card and a hard disk that is attachable to and detachable from the camera body 100, and is capable of recording an image obtained by capturing a subject, for example. The external recording medium 300 of the present embodiment adopts a memory card that can be inserted into and removed from the camera body 100, but the present invention is not limited thereto, and it is also possible to adopt an optical disk such as a DVD-RW disk or a magnetic disk such as a hard disk. A basic configuration of the camera according to the present embodiment is as described above.

Figure 3A:
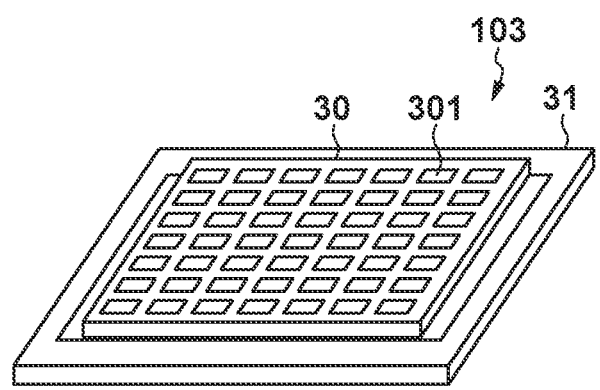
FIGS. 3A and 3B illustrate a configuration of an imaging element according to one embodiment.
Figure 3B:
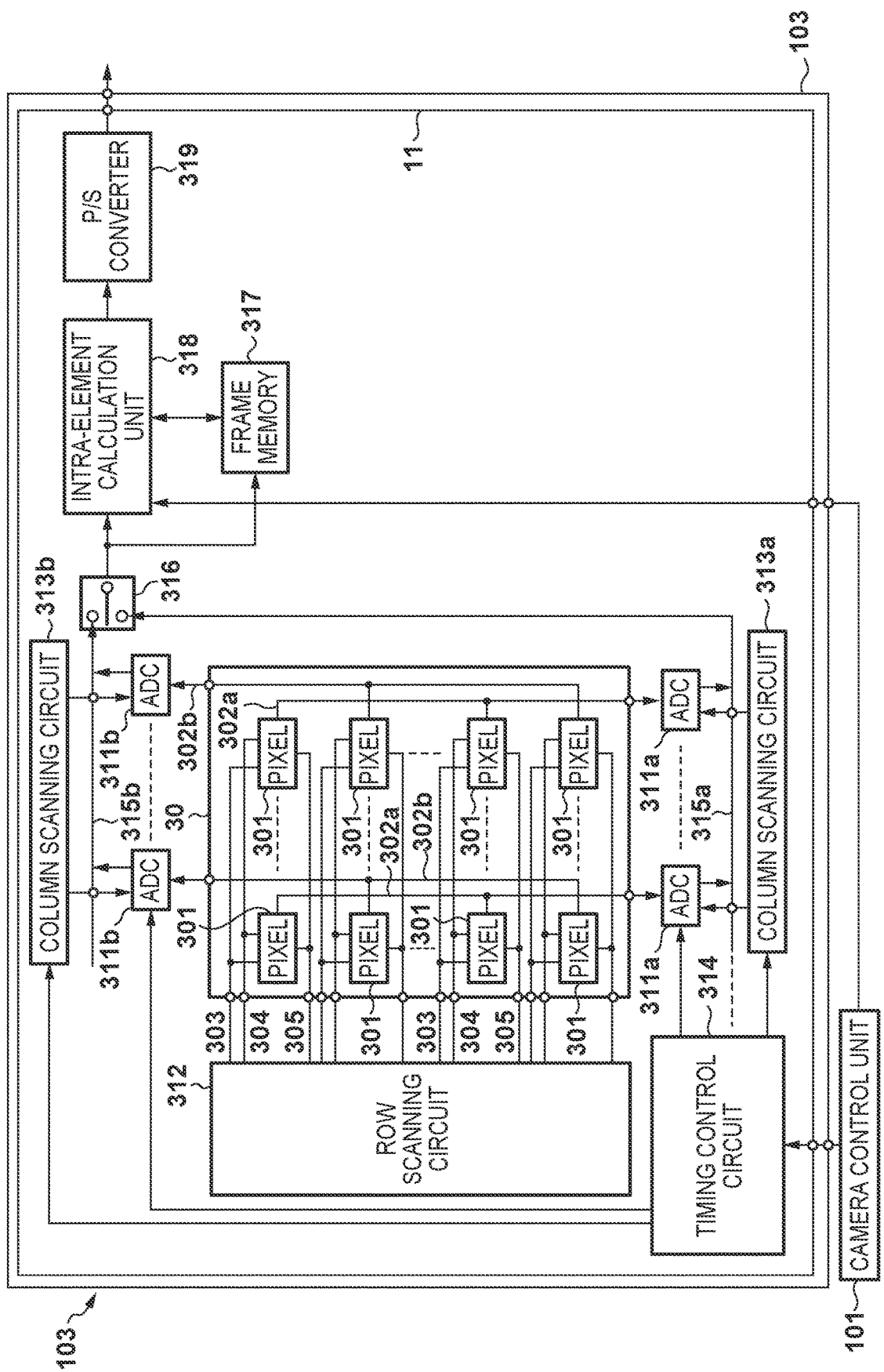

FIGS. 3A and 3B are diagrams illustrating a configuration of the imaging element 103 according to the present embodiment. FIG. 3A is an oblique top view of the imaging element 103 as viewed from a light incident side, and FIG. 3B is a diagram illustrating a schematic block configuration of the imaging element 103.

As illustrated in FIG. 3A, the imaging element 103 is composed of a stack of a first chip 30 disposed on the light incident side in which a plurality of pixels 301 are formed in two dimensions, and a second chip 31 in which pixel driving circuits including column scanning circuits 313a and 313b, a row scanning circuit 312 and the like are formed.

In the block configuration illustrated in FIG. 3B, the imaging element 103 includes the pixels 301, vertical output lines 302a and 302b, transfer signal lines 303, reset signal lines 304, a row selection signal line 305, column ADC blocks 311a and 311b, the row scanning circuit 312, the column scanning circuits 313a and 313b, a timing control circuit 314, and horizontal signal lines 315a and 315b. Further, the imaging element 103 includes a selector switch 316, a frame memory 317, an intra-element calculation unit 318, and a parallel-serial conversion unit (illustrated as P/S converter) 319.

In the first chip 30, the pixels 301 are arranged in a matrix, and are connected with the transfer signal line 303, the reset signal line 304, and the row selection signal line 305 in the horizontal direction (row direction). In addition, the pixel is connected with the vertical output line 302a or 302b in the vertical direction (column direction). Each of the vertical output lines 302a and 302b differs in connected row for each of read rows. For example, the pixels in odd rows are connected with the vertical output lines 302a, and the pixels in even rows are connected with the vertical output lines 302b. In this case, the pixels in odd rows are transferred downward in the figure by the vertical output lines 302a, converted to digital data by the column ADC block 311a, and read as an output of a first channel. The pixels in even rows are transferred upward in the figure by the vertical output lines 302b, converted to digital data by the column ADC block 311b, and read as an output of a second channel. With such a configuration, in the present embodiment, the pixels of the first channel of odd rows and the pixels of the second channel of even rows can simultaneously accumulate respective electric charges for different exposure times, and respective image signals differing from each other can be simultaneously output.

The second chip 31 includes pixel driving circuits including the column ADC blocks 311a and 311b, the row scanning circuit 312, the column scanning circuits 313a and 313b, the timing control circuit 314 and the like, and peripheral circuits including the frame memory 317, the intra-element calculation unit 318, and the P/S converter 319 and the like.

With the above-mentioned configuration in which the pixels 301 are disposed in the first chip 30, and the pixel driving circuit, the peripheral circuit and the like are disposed in the second chip 31, the imaging layer and the circuit layer of the imaging element 103 can be provided by separate manufacturing processes. It is thus possible to achieve speedup, size reduction, and enhanced functionality with thinner and denser wirings in the circuit layer.

The selector switch 316 is a switch for switching between the above-mentioned first and second channels to selectively output the image signals output from the horizontal signal lines 315a and 315b sequentially to the frame memory 317. The frame memory 317 temporarily stores the output image signals. The intra-element calculation unit 318 performs calculation of a subject distance in the imaging element, and the like. The image information processed by the intra-element calculation unit 318 and the data stored in the frame memory 317 are subjected to a parallel-serial conversion at the P/S converter 319 in accordance with the timing of the signal output by the timing control circuit 314, and then sent out of the imaging element 103.

Figure 5:
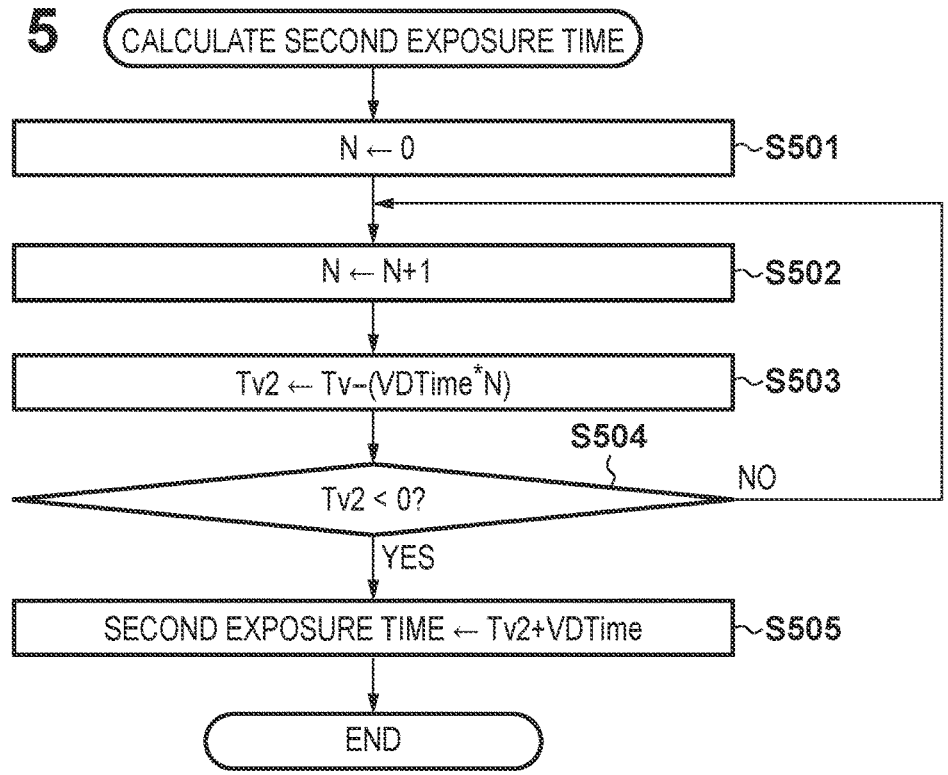
FIG. 5 is a flowchart illustrating operations for determining a second exposure time according to one embodiment.
Figure 6:
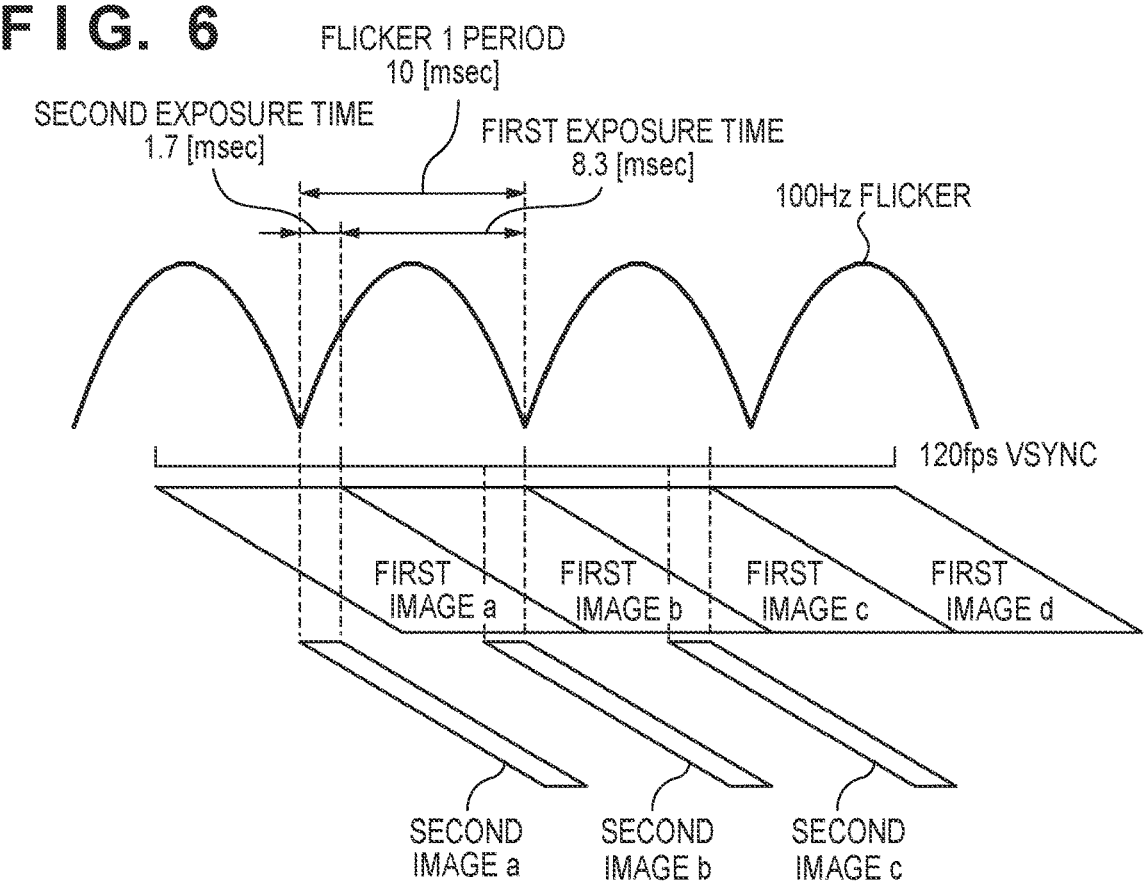
FIG. 6 is a diagram illustrating a combination of a combining process of a first image and a second image according to one embodiment.

A feature of the present embodiment, i.e., a flow from determination of a first exposure time and a second exposure time to combination of images, is described below with reference to flowcharts of FIGS. 4 and 5 and a schematic diagram of FIG. 6.

Figure 4:
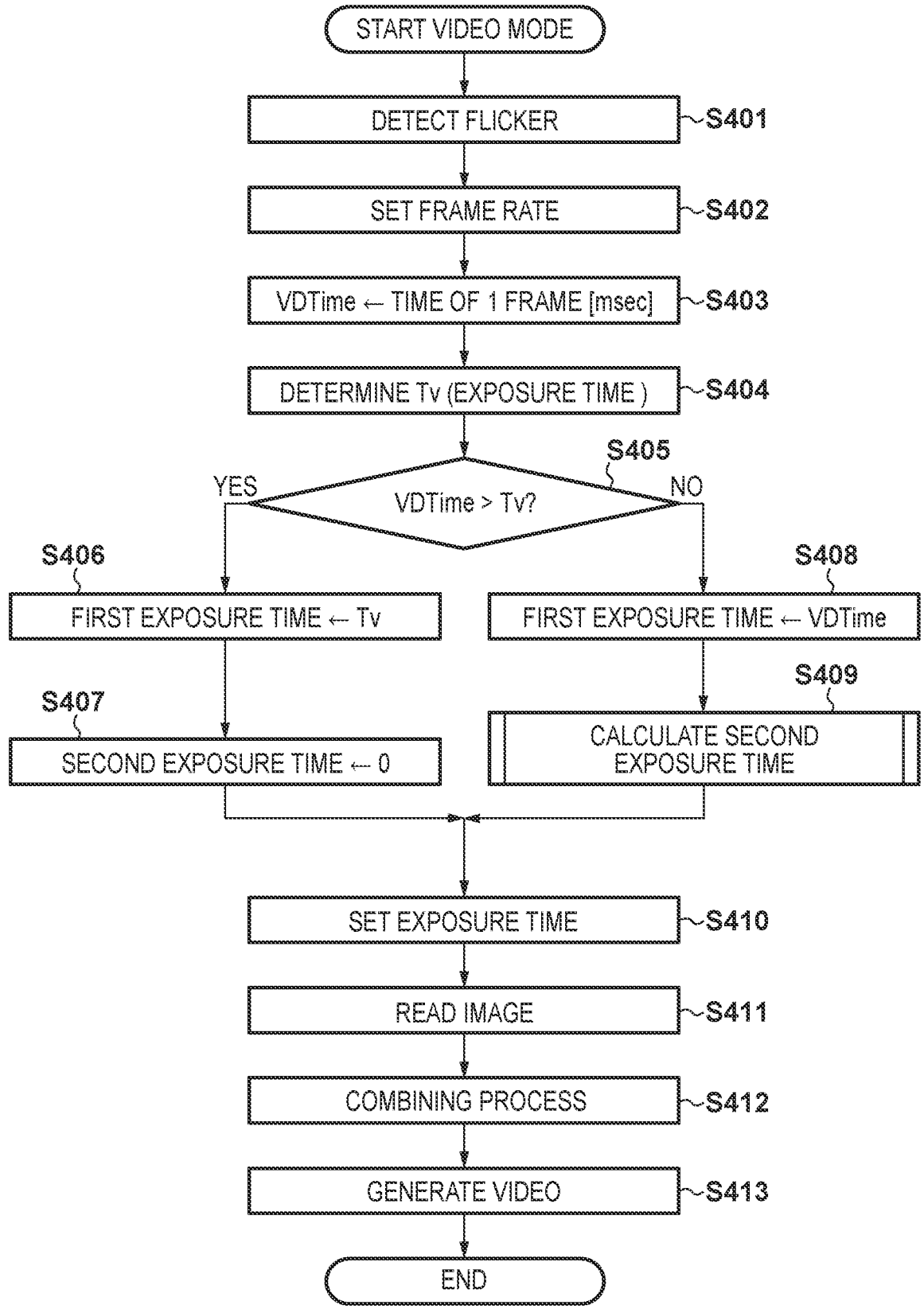
FIG. 4 is a flowchart from a start to end of video capturing according to one embodiment.

FIG. 4 is a flowchart illustrating a flow of operations in a video mode according to the present embodiment. When the video mode is started, first, the camera control unit 101 detects flicker with use of the flicker detection unit 116 at step S401. When the detection is completed, the user is caused to set the frame rate for the recording at step S402.

The frame rate set here is the frame rate of image-capturing, and the driving of the imaging element for capturing a video is changed.

When the change is completed, the camera control unit 101 holds the time of one frame of the frame rate set at step S402 as a VDTime at step S403, and determines an exposure time (Tv) for the video to be recorded, at step S404. When flicker is detected at step S401, the exposure time Tv is set to a time of an integer multiple of the time of one period (herein after referred to as FLKTime) of the flicker, with the FLKTime being the shortest exposure time.

At step S405, the camera control unit 101 compares the VDTime determined at step S403 and the Tv determined at step S404. When it is determined that the VDTime is longer, the step proceeds to step S406, and the Tv determined at step S404 is set to the first exposure time without any change, and, the second exposure time is set to 0.

Meanwhile, when it is determined at step S405 that the Tv is longer, the VDTime is set to the first exposure time at step S408. Practically, the first exposure time matches the time of one frame although the first exposure time is the maximum exposure time that can be set in one frame. Then, at step S409, the second exposure time is calculated.

Now, details of the operation at step S409 are described with reference to FIG. 5. FIG. 5 is a flowchart illustrating a method of determining a second exposure time. At step S501, the camera control unit 101 initializes a calculation variable N to 0. At step S502, the calculation variable N is incremented by one and the step proceeds to step S503. At step S503, the camera control unit 101 subtracts a time obtained by multiplying the VDTime by the N from the Tv determined at step S404, and sets a result as a Tv2. When the Tv2 is still a positive value, the step is returned to step S502 to repeat the same process. At step S504, when the Tv2 has a negative value for the first time, the exposure time Tv is represented as follows.

$$Tv = \{VDTime \times (N-1) + \alpha\}(\alpha < VDTime)$$

Then, at step S505, the camera control unit 101 determines the second exposure time to be (Tv2+VDTime). Here, the Tv2 is a negative value and the second exposure time (Tv2+VDTime) matches α in the above equation.

When the second exposure time is determined, the step is returned to step S410 of FIG. 4, and the camera control unit 101 sets the first exposure time and the second exposure time to the imaging element 103. When the first and second exposure times are set, the camera control unit 101 causes the first channel (first region) of the odd rows of the imaging elements 103 to perform first imaging for the first exposure time and causes the second channel (the region other than the first region) of the even rows to perform second imaging for the second exposure time. The first and second imaging are performed in a temporally continuous manner. When the imaging of each set exposure time is completed, the image is read at step S411 and the step proceeds to a combining process of step S412. Note that the present invention is not limited to the configuration in which the first channel is caused to perform the first imaging and the second channel is caused to perform the second imaging, and the first channel may be caused to perform the second imaging and the second channel may be caused to perform the first imaging.

The combining process of step S412 is described with reference to a schematic diagram of FIG. 6. FIG. 6 illustrates an exemplary case where a frame rate of a video is 120 fps and flicker of 100 Hz occurs. In this case, the Tv is set to 10 msec as with the one time period of the flicker, and the first exposure time is set to 8.3 msec, which is one frame time of 120 fps, and, the second exposure time is set to 1.7 msec, which is a difference between 10 msec and 8.3 msec. Here, the images used for the combining process to eliminate flicker of 100 Hz are a combination with temporally continuous exposures and a total exposure time of 10 msec. Thus, the first image b captured in the first channel and the second image a captured in the second channel of the imaging element 103 illustrated in FIG. 6 are combined. In this case, while the exposure time of the second image a overlaps the exposure time of the first image a, the first image a and the second image a are captured separately in different rows (the first channel and the second channel) in alternating rows of the imaging element 103, and thus the images can be simultaneously output. Likewise, a first image c and a second image b are combined, and a first image d and a second image c are combined. When the image combining process is completed, the step proceeds to step S413, and a video image is generated with the combined image.

As described above, according to the present embodiment, it is possible to capture a video while surely reducing the influence of flicker without the need for a process of calculating a correction coefficient by predicting the period of flicker and the timing of the imaging.

At step S407, the second exposure time is set to 0 such that the second image is not accumulated, but the second image may be accumulated for any exposure time, and the combining process may not be performed at step S412.

In addition, in the combining process of step S412, it suffices that the total exposure time is equal to the time of one period of the detected flicker in the images used in the combining process, and therefore a plurality of first images with continuous exposure times may be used for the combination. In this case, for example, in the case where one period of the flicker is twice the one frame time, the first image captured in the current frame and the first image captured in the last frame are combined. In addition, in the case where one period of the flicker is N times the frame time, the first image captured in the current frame and (N−1) first images captured in the (N−1) frames until the last frame, may be combined. Likewise, in the case where one period of the flicker is longer than N times the one frame time and shorter than (N+1) times the one frame time, the first image captured in the current frame, the (N−1) first images captured in the (N−1) frames until the last frame, and further the second image may be combined.

That is, an exposure time of a first image to be combined is not limited to a maximum exposure time that is settable in one frame. A plurality of images to be combined can be images which are continuously captured and whose total exposure time is an integer multiple of the period of the flicker.

The method of the embodiment is also effective in both schemes of a slit rolling shutter scheme and a global shutter scheme.

A so-called lens changeable image capturing apparatus in which the camera body 100 and the lens unit 200 are separated from each other is described in the above-mentioned embodiment as an example of an image capturing apparatus that implements the present invention, but the present invention is not limited thereto. For example, a so-called lens integrated image capturing apparatus in which an image capturing apparatus main body and a lens unit are integrally formed may be an image capturing apparatus that implements the present invention. While a digital camera has been described in the above-mentioned embodiment as an example of an image capturing apparatus that implements the present invention, the present invention is not limited thereto. For example, the present invention may have a configuration to adopt an image capturing apparatus other than a digital camera or an image capturing apparatus intended for a variety of applications, such as a portable device such as a digital video camera or a smart phone, a wearable terminal, a security camera, an on-board camera, and the like.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-159475, filed Aug. 28, 2018 which is hereby incorporated by reference herein in its entirety.

What is claimed is:

1. An image capturing apparatus comprising:
an imaging element in which a plurality of pixels are two-dimensionally arranged, the imaging element being capable of simultaneously performing exposures of different exposure times at pixels in different regions;
at least one processor or circuit configured to function as the following units;
a detection unit configured to detect flicker; and
a control unit configured to control the imaging element such that, in a case where imaging is performed at a frame rate shorter than a period of the flicker detected by the detection unit, a first image is captured in a first region of the imaging element for a first exposure time, the first exposure time being an exposure time settable in one frame in the frame rate, and a second image is captured in a second region different from the first region of the imaging element for a second exposure time, the second exposure time being a difference between a time of an integer multiple of the first exposure time and a time of the period of the flicker.

2. The image capturing apparatus according to claim 1, wherein the first exposure time is a maximum exposure time settable in one frame in the frame rate.

3. The image capturing apparatus according to claim 1, wherein the control unit sets the first exposure time and the second exposure time such that a time obtained by adding up the time of the integer multiple of the first exposure time and the second exposure time matches the time of the period of the flicker.

4. The image capturing apparatus according to claim 1, wherein the at least one processor or circuit is configured to further function as a combining unit configured to combine the first image and the second image into a single frame image.

5. The image capturing apparatus according to claim 4, wherein the combining unit combines the first image in a different frame in a case where the time of the period of the flicker is an integer multiple of the first exposure time.

6. The image capturing apparatus according to claim 4, wherein, when imaging is performed at a frame rate longer than the period of the flicker, the combining unit does not combine the images.

7. The image capturing apparatus according to claim 1, wherein the first region is a region obtained by combining alternating rows of the imaging element, and the second region is a region obtained by combining alternating rows in a region other than the first region of the imaging element.

8. The image capturing apparatus according to claim 1, wherein, when imaging is performed at a frame rate longer than the period of the flicker, the control unit matches the first exposure time to a time of an integer multiple of the period of the flicker.

9. The image capturing apparatus according to claim 8, wherein, when imaging is performed at a frame rate longer than the period of the flicker, the control unit sets the second exposure time to 0.

10. The image capturing apparatus according to claim 1, wherein the first exposure time and the second exposure time are continuous exposure times.

11. A method of controlling an image capturing apparatus comprising an imaging element in which a plurality of pixels are two-dimensionally arranged, the imaging element being capable of simultaneously performing exposures of different exposure times at pixels in different regions, the method comprising:
detecting flicker; and
controlling the imaging element such that, in a case where imaging is performed at a frame rate shorter than a period of the flicker detected by the detecting, a first image is captured in a first region of the imaging element for a first exposure time, the first exposure time being an exposure time settable in one frame in the frame rate, and a second image is captured in a second region different from the first region of the imaging element for a second exposure time, the second exposure time being a difference between a time of an integer multiple of the first exposure time and a time of the period of the flicker.

12. A non-transitory computer-readable storage medium storing programs for causing a computer to perform each of steps of a method of controlling an image capturing apparatus comprising an imaging element in which a plurality of pixels are two-dimensionally arranged, the imaging element being capable of simultaneously performing exposures of different exposure times at pixels in different regions, the method comprising:
  detecting flicker; and
  controlling the imaging element such that, in a case where imaging is performed at a frame rate shorter than a period of the flicker detected by the detecting, a first image is captured in a first region of the imaging element for a first exposure time, the first exposure time being an exposure time settable in one frame in the frame rate, and a second image is captured in a second region different from the first region of the imaging element for a second exposure time, the second exposure time being a difference between a time of an integer multiple of the first exposure time and a time of the period of the flicker.

* * * * *